United States Patent
Chen et al.

(10) Patent No.: US 11,129,108 B2
(45) Date of Patent: Sep. 21, 2021

(54) TERMINAL DEVICE SENDING POWER INFORMATION FOR A FIRST SERVICE AND SECOND SERVICE PERFORMED IN A FIRST TIME PERIOD

(71) Applicant: GUANGDONG OPPO MOBILE TELECOMMUNICATIONS CORP., LTD., Guangdong (CN)

(72) Inventors: Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/619,881

(22) PCT Filed: Aug. 10, 2017

(86) PCT No.: PCT/CN2017/096889
§ 371 (c)(1),
(2) Date: Dec. 5, 2019

(87) PCT Pub. No.: WO2019/028762
PCT Pub. Date: Feb. 14, 2019

(65) Prior Publication Data
US 2021/0022081 A1 Jan. 21, 2021

(51) Int. Cl.
*H04W 52/14* (2009.01)
*H04W 52/28* (2009.01)
*H04W 52/34* (2009.01)

(52) U.S. Cl.
CPC ....... *H04W 52/146* (2013.01); *H04W 52/281* (2013.01); *H04W 52/346* (2013.01)

(58) Field of Classification Search
CPC . H04W 52/16; H04W 52/281; H04W 52/346; H04W 52/30; H04W 52/34;
(Continued)

(56) References Cited

U.S. PATENT DOCUMENTS

| 2016/0198421 A1 | 7/2016 | Yi et al. |
| 2016/0205631 A1 | 7/2016 | Chen et al. |

(Continued)

FOREIGN PATENT DOCUMENTS

| CN | 1773881 | 5/2006 |
| CN | 105338635 | 2/2016 |

(Continued)

OTHER PUBLICATIONS

EPO, Communication for EP Application No. 17920947.3, dated Dec. 22, 2020.
(Continued)

*Primary Examiner* — Philip Sobutka
(74) *Attorney, Agent, or Firm* — Hodgson Russ LLP (57) ABSTRACT

The embodiments of the present application provides a wireless communication method and a wireless communication device. The method includes: determining, by a terminal device, power information for performing uplink transmission of a first service in a first time period, wherein the terminal device simultaneously performs uplink transmission of the first service and at least one second service in the first time period; and sending, by the terminal device, the power information to a network device in the uplink transmission of the second service performed in the first time period.

22 Claims, 6 Drawing Sheets

(58) Field of Classification Search
CPC .............. H04W 52/343; H04W 52/365; H04W 52/367; H04W 72/04; H04W 28/06
USPC ........................................................ 455/522
See application file for complete search history.

(56) References Cited

U.S. PATENT DOCUMENTS

| | | |
|---|---|---|
| 2016/0255594 A1 | 9/2016 | Vajapeyam et al. |
| 2018/0279291 A1* | 9/2018 | Tiirola .................. H04B 1/713 |

FOREIGN PATENT DOCUMENTS

| | | |
|---|---|---|
| RU | 2463732 | 10/2012 |
| WO | 2007143721 | 12/2007 |
| WO | 2009039447 | 3/2009 |
| WO | 2009155579 | 12/2009 |
| WO | 2009158050 | 12/2009 |

OTHER PUBLICATIONS

FSIP, Office Action for RU Application No. 2019142487/07, dated Oct. 9, 2020.
Huawei et al., "Discussion on UL multiplexing of grant-based eMBB and grant-free URLLC," 3GPP TSG RAN WG1 NR Ad Hoc Meeting, R1-1709988, Jun. 2017, 6 pages.
EPO, Office Action for EP Application No. 17920947.3, dated Apr. 21, 2020.
Samsung, "Power Control for Multiplexing of eMBB and URLLC," 3GPP TSG RAN WG1 Meeting #88, R1-1702995, Feb. 2017, 6 pages.
WIPO, ISR for PCT/CN2017/096889, dated Apr. 28, 2018.
KIPO, Office Action for KR Application No. 10-2019-7035850, dated Mar. 29, 2021.
IPI, Office Action for IN Application No. 201917050630, dated Feb. 2, 2021.
ISDEC, Office Action for CA Application No. 3065109, dated Feb. 1, 2021.
EPO, Communication for EP Application No. 17920947.3, dated May 25, 2021.

* cited by examiner

TERMINAL DEVICE SENDING POWER INFORMATION FOR A FIRST SERVICE AND SECOND SERVICE PERFORMED IN A FIRST TIME PERIOD

CROSS-REFERENCE TO RELATED APPLICATION

This application is a U.S. national phase application of International Application No. PCT/CN2017/096889, filed Aug. 10, 2017, the entire disclosure of which is incorporated herein by reference.

TECHNICAL FIELD

Embodiments of the present application relate to the field of communications, and in particular, to a wireless communication method, a terminal device, and a network device.

BACKGROUND

In wireless communication, a network device can demodulate service based on power for transmitting the service by a terminal device.

In future wireless communication process, the process of wireless transmission is complicated, and there may be a situation where transmission power of the terminal device has changed, but the network device does not know about it.

SUMMARY

Embodiments of the present application provide a wireless communication method and a wireless communication device.

In a first aspect, a wireless communication method is provided, including:

determining, by a terminal device, power information for performing uplink transmission of a first service in a first time period, wherein the terminal device simultaneously performs uplink transmission of the first service and at least one second service in the first time period; and sending, by the terminal device, the power information to a network device in the uplink transmission of the second service performed in the first time period.

Based on the first aspect, in a possible implementation of the first aspect, the second service has a higher priority than that of the first service.

Based on the first aspect or any one of the above possible implementations, in another possible implementation of the first aspect, the first service is an enhanced mobile broadband eMBB service; and the second service is a low latency high reliability scenario URLLC service.

Based on the first aspect or any one of the above possible implementations, in another possible implementation of the first aspect, sending, by the terminal device, the power information to a network device in the uplink transmission of the second service performed in the first time period includes:

carrying the power information in a first message sent by the terminal device to the network device, wherein the first message further carries data of the second service or other information.

Based on the first aspect or any one of the above possible implementations, in another possible implementation of the first aspect, determining, by a terminal device, power information for performing uplink transmission of a first service in a first time period, includes:

determining power information for performing uplink transmission of the first service in the first time period according to the power for transmitting the second service by the terminal device to the network device in the first time period and/or a power difference set corresponding to the first service, wherein the power difference set includes an optional difference value between an actual power used by the terminal device for performing uplink transmission of the first service and a specific power.

Based on the first aspect or any one of the above possible implementations, in another possible implementation of the first aspect, the difference set is preset on the terminal device or configured by the network device to the terminal device.

Based on the first aspect or any one of the above possible implementations, in another possible implementation of the first aspect, the power information is used to indicate:

whether an actual power used by the terminal device for performing uplink transmission of the first service in the first time period equals to a specific power; and/or information on a difference between the actual power used by the terminal device for performing uplink transmission of the first service in the first time period and the specific power.

Based on the first aspect or any one of the above possible implementations, in another possible implementation of the first aspect, the information on the difference includes a quantized value or an identification of a range to which the difference belongs.

Based on the first aspect or any one of the above possible implementations, in another possible implementation of the first aspect, the specific power is a power used for performing transmission of the first service separately in a time period immediately before the first time period.

In a second aspect, a wireless communication method is provided, the method including:

determining, by a terminal device, a power used for performing transmission a first service according to a power difference set corresponding to the first service and a power used by the terminal device for performing transmission of a second service in a first time period, wherein the power difference set includes an optional difference between an actual power used by the terminal device for performing uplink transmission of the first service and a specific power; and performing, by the terminal device, transmission of the second service during the first time period according to the determined power.

Based on the second aspect, in a possible implementation of the second aspect, the specific power is a power used for performing transmission of the first service separately in a time period immediately before the first time period.

Based on the second aspect or any one of the above possible implementations, in another possible implementation of the second aspect, the second service has a higher priority than that of the first service.

Based on the second aspect or any one of the above possible implementations, in another possible implementation of the second aspect, the first service is an enhanced mobile broadband eMBB service; and the second service is a low latency high reliability scenario URLLC service.

Based on the second aspect or any one of the above possible implementations, in another possible implementation of the second aspect, the difference set is preset on the terminal device or configured by the network device to the terminal device.

In a third aspect, a wireless communication method is provided, including:

receiving, by a network device, power information sent by a terminal device in uplink transmission of a second service performed by the terminal device in a first time period, wherein the power information is power information for performing uplink transmission of a first service by the terminal device in the first time period; and demodulating, by the network device, the first service according to the power information.

Based on the third aspect, in a possible implementation of the third aspect, the second service has a higher priority than that of the first service.

Based on the third aspect or any one of the above possible implementations, in another possible implementation of the third aspect, the first service is an enhanced mobile broadband eMBB service; and the second service is a low latency high reliability scenario URLLC service.

Based on the third aspect or any one of the above possible implementations, in another possible implementation of the third aspect, the power information is carried in a first message received in the first time period, and the first message further carries data of the second service or other information.

Based on the third aspect or any one of the above possible implementations, in another possible implementation of the third aspect, the power information is used to indicate:

whether an actual power used by the terminal device for performing uplink transmission of the first service in the first time period equals to a specific power; and/or information on a difference between the actual power used by the terminal device for performing uplink transmission of the first service in the first time period and the specific power.

Based on the third aspect or any one of the above possible implementations, in another possible implementation of the third aspect, the difference information includes a quantized value; and demodulating, by the network device, the first service according to the power information, includes:

demodulating the first service with the quantized value.

Based on the third aspect or any one of the above possible implementations, in another possible implementation of the third aspect, the difference information includes an identification of a range to which the difference belongs; and demodulating, by the network device, the first service according to the power information, includes:

demodulating the first service with a difference included in the range.

Based on the third aspect or any one of the above possible implementations, in another possible implementation of the third aspect, the specific power is a power used for performing transmission of the first service separately a time period immediately before the first time period.

In a fourth aspect, a wireless communication method is provided, the method including:

acquiring, by a network device, a power difference set corresponding to a first service, when a terminal device simultaneously transmits the first service and a second service to the network device in a first time period; and demodulating, by the network device, the first service in the first time period according to the power difference set, wherein the power difference set includes an optional difference between an actual power used by the terminal device for performing uplink transmission of the first service and a specific power.

Based on the fourth aspect, in a possible implementation of the fourth aspect, the specific power is a power used for performing transmission of the first service separately a time period immediately before the first time period.

Based on the fourth aspect or any one of the above possible implementations, in another possible implementation of the fourth aspect, the second service has a higher priority than that of the first service.

Based on the fourth aspect or any one of the above possible implementations, in another possible implementation of the fourth aspect, the first service is an enhanced mobile broadband eMBB service; and the second service is a low latency high reliability scenario URLLC service.

Based on the fourth aspect or any one of the above possible implementations, in another possible implementation of the fourth aspect, the method further includes:

configuring, by the network device, the power difference set to the terminal device.

In a fifth aspect, a terminal device is provided for performing the method in the first aspect or any possible implementation of the first aspect or in the second aspect or any possible implementation of the second aspect described above. In particular, the terminal device includes functional modules for performing the method in the first aspect or any possible implementation of the first aspect or in the second aspect or any possible implementation of the second aspect described above.

In a sixth aspect, a network device is provided for performing the method in the third aspect or any possible implementation of the third aspect or in the fourth aspect or any possible implementation of the fourth aspect described above. In particular, the network device includes functional modules for performing the method in the third aspect or any possible implementation of the third aspect or in the fourth aspect or any possible implementation of the fourth aspect described above.

In a seventh aspect, a terminal device is provided, including a processor, a memory, and a transceiver. The processor, the memory, and the transceiver communicate with one another through an internal connection path, to transmit control and/or data signals, such that the terminal device performs the method in the first aspect or any possible implementation of the first aspect or in the second aspect or any possible implementation of the second aspect described above.

In an eighth aspect, a network device is provided, including a processor, a memory, and a transceiver. The processor, the memory, and the transceiver communicate with one another through an internal connection path, to transmit control and/or data signals, such that the network device performs the method in the third aspect or any possible implementation of the third aspect or in the fourth aspect or any possible implementation of the fourth aspect described above.

In a ninth aspect, a computer readable medium for storing a computer program is provided, the computer program including instructions for performing the method of any of the above aspects or any of the possible implementations thereof.

In a tenth aspect, a computer program product is provided, including instructions, when being run on a computer, cause the computer to perform the method of any of the above aspects or any of the possible implementations thereof.

DETAILED DESCRIPTION

The technical solutions in the embodiments of the present application will be described below with reference to the accompanying drawings.

The technical solution of the embodiment of the present application can be applied to various communication systems, for example, a Global System of Mobile communication ("GSM") system, a Code Division Multiple Access ("CDMA") System, a Wideband Code Division Multiple Access (WCDMA) system, General Packet Radio Service ("GPRS"), Long Term Evolution ("LTE") system, LTE Frequency Division Duplex ("FDD") system, LTE Time Division Duplex ("TDD"), a Universal Mobile Telecommunication System ("UMTS"), a Worldwide Interoperability for Microwave Access ("WiMAX") communication system, or a future 5G (also known as a New Radio (NR)) system, or the like.

The network device mentioned in the embodiments of the present application may be a device that communicates with a terminal device. The network device can provide communication coverage for a particular geographic area and can communicate with terminal devices (e.g., UEs) located within the coverage area. Optionally, the network device may be a base station (Base Transceiver Station, BTS) in a GSM system or a CDMA system, or may be a base station (NodeB, NB) in a WCDMA system, or may be an evolved base station (Evolutional Node B, eNB or eNodeB) in an LTE system, or a wireless controller in a Cloud Radio Access Network (CRAN), or the network device can be a relay station, an access point, different antenna panels (Antenna panel) of the same base station, a Transmitting-Receiving point (TRP), an in-vehicle device, a wearable device, and a network side device in a future 5G network, a network side device in a future evolved PLMN network or the like.

The terminal device in the embodiments of the present application may be mobile or fixed. Optionally, the terminal device may also refer to a user equipment (UE), an access terminal, a subscriber unit, a subscriber station, a mobile station, a mobile platform, a remote station, a remote terminal, a mobile device, a user terminal, a terminal, a wireless communication device, and a user agent or a user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in a future 5G network, a terminal device in a future evolved public land mobile network (PLMN) or the like.

In a NR system, ultra-reliable low-latency communication (URLLC) services have better reliability and lower latency.

The URLLC service can be used in more demanding areas such as industrial internet and autonomous driving.

In order to satisfy low latency, the transmission time of the URLLC service can be reduced (for example, mini-slot is introduced) and retransmission can be reduced.

In the NR system, 1 slot is defined as 7 or 14 symbols, and the number of symbols may vary for different subcarrier intervals.

At the same time, in the NR system, Enhanced Mobile Broadband (eMBB) can also be performed at the same time. The eMBB service is a broadband service that includes various common services such as browsing webpages and videos.

For a UE that can support both eMBB and URLLC, eMBB uplink data and URLLC uplink data transmission may occur at the same time in some application scenarios.

Figure 1:
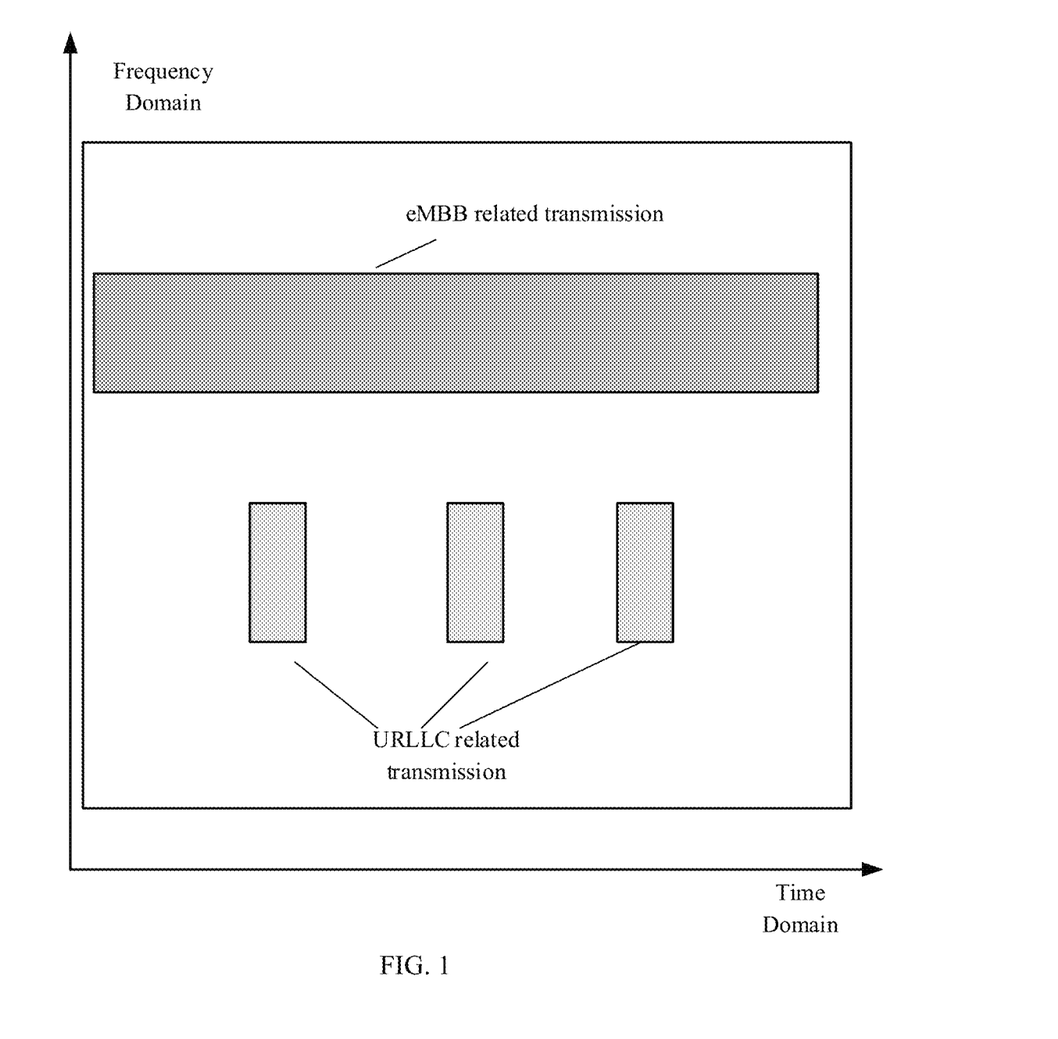
FIG. 1 is a schematic diagram of eMMB service and URLLC service transmission according to an embodiment of the present application.
Figure 2:
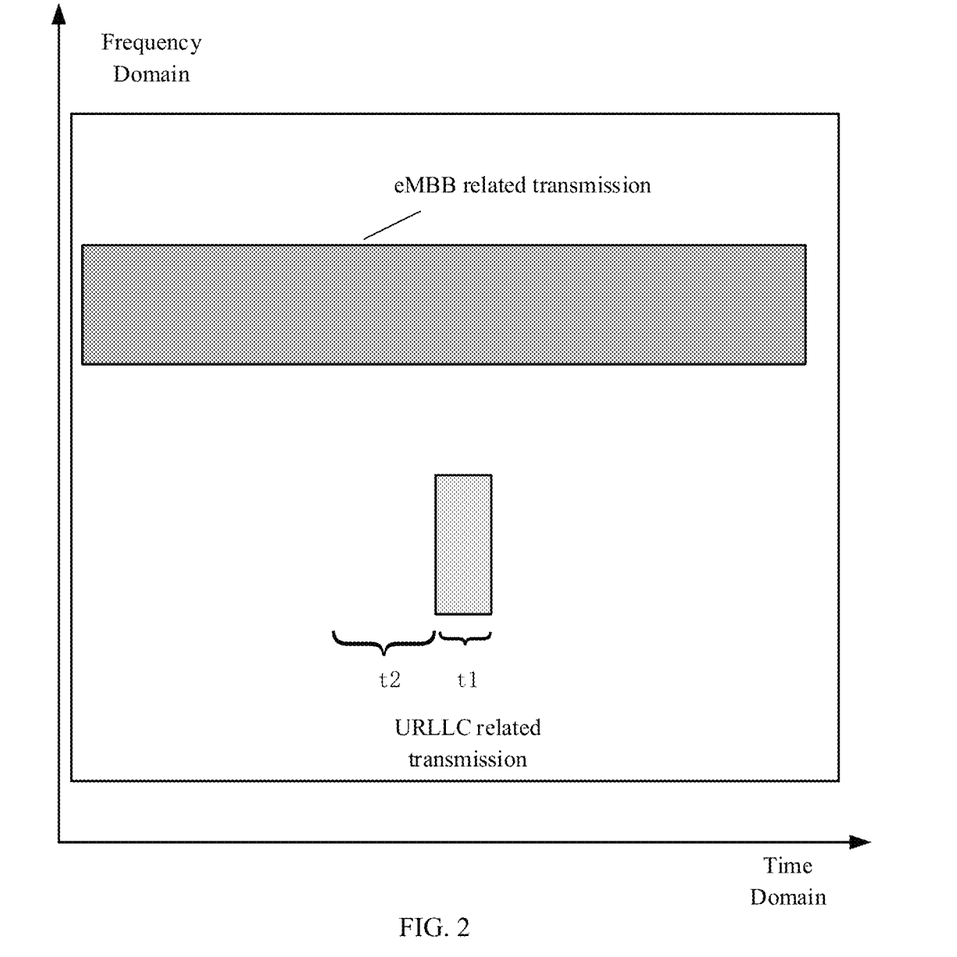
FIG. 2 is a schematic diagram of eMMB service and URLLC service transmission according to an embodiment of the present application.

For example, as shown in FIG. 1 and FIG. 2, uplink URLLC transmission (referred to as channel U for short) and uplink eMBB transmission (referred to as channel e for short) overlap in time. The transmission powers required by the two channels are recorded as P_U and P_e, respectively. If P_U+P_e>P_max, power control is required.

Optionally, since the URLLC service has higher delay/reliability requirements, the priority of the power allocation is higher. Generally, the power is preferentially allocated to the URLLC service, and the eMMB service is allocated with power less than the required power P_e.

Due to its high latency requirement, the URLLC service has a short interval between the time when there are data to be transmitted and the time when the data is actually transmitted. Therefore, when the UE starts an eMBB transmission, it is not sure during the transmission whether there will be a URLLC concurrent transmission.

In order to effectively solve the power allocation problem at the time of concurrency, there are two solutions to the problem.

Solution 1. Semi-static upper limit allocation: the network allocates a power upper limit to eMBB and/or URLLC through signaling.

Solution 2. When concurrency occurs, the UE dynamically allocates power between eMBB and URLLC according to a certain rule.

In Solution 2, there may be a case where the transmission powers for different parts are different in one eMBB transmission. As shown in FIG. 2 below, the eMBB requires a transmitting power of P_e. When there is no concurrent transmission with the URLLC (for example, in the time period t2), the UE can use the power P_e to transmit; when concurrency occurs (for example, in the time period t1), part of the power may be allocated for URLLC transmission, so that the UE has to use only power P_1 to send eMBB (P_1<P_e).

In this case, if the network side does not know that the power has changed, the performance of channel estimation, data demodulation (16 QAM, 64 QAM, . . . ) may be significantly degraded.

Therefore, for the problem and the like, the embodiments of the present application provide the following solutions.

Figure 3:
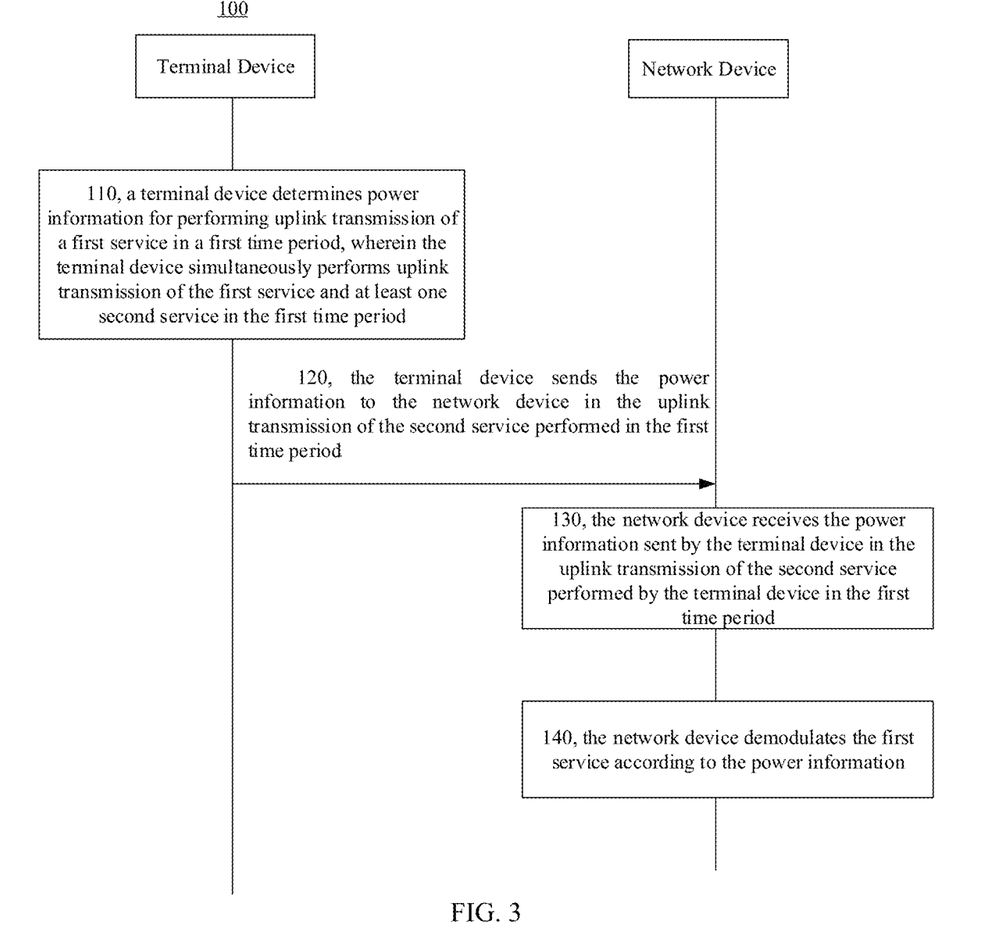
FIG. 3 is a schematic flowchart of a wireless communication method according to an embodiment of the present application.

FIG. 3 is a schematic flowchart of a communication method 100 according to an embodiment of the present application. The method 100 includes at least some of the following.

In 110, a terminal device determines power information for performing uplink transmission of a first service in a first time period, wherein the terminal device simultaneously performs uplink transmission of the first service and at least one second service in the first time period.

Optionally, the second service has a higher priority than that of the first service.

Optionally, the first service is an eMBB service; and the second service is a URLLC service.

It should be understood that the first service and the second service may also be other two kinds of services, or two different services.

It is also understood that, in the embodiment of the present application, although the first service and the second service are described, it does not mean that only two services are simultaneously transmitted. For example, the first service may include a plurality of services, or the second service may include a plurality of services, or other third services may exist at the same time.

Optionally, the power information is used to indicate whether an actual power used by the terminal device for performing uplink transmission of the first service in the first time period equals to a specific power; and/or information on a difference between the actual power used by the terminal device for performing uplink transmission of the first service in the first time period and the specific power.

Specifically, the terminal device may carry information related to f(P_e, P_1) in the transmission of the URLLC, where f is a function, and the value thereof has the following possible manners.

Manner 1: P_e and P_1 are the same, or different. That is, whether the power has changed during the eMBB transmission.

In Manner 1, it can implicitly indicate whether the power of eMBB has changed during the current transmission. If there is no corresponding field in the transmission message of the second service, it means that the power has not changed and if there is a corresponding field, it means that the power has changed. Alternatively, it can explicitly indicate whether the power has changed. For example, a corresponding message in the transmission message of the second service indicates whether the power has changed.

In Manner 2, f is a function related to the difference value (P_1−P_e). For example, f is a quantized value of (P_1−P_e), or an identification corresponding to a value range of (P_1−P_e).

In 120, the terminal device sends the power information to the network device in the uplink transmission of the second service performed in the first time period.

Optionally, the power information is carried in a first message sent by the terminal device to the network device, wherein the first message further carries data of the second service or other information.

In 130, the network device receives the power information sent by the terminal device in the uplink transmission of the second service performed by the terminal device in the first time period, wherein the power information is power information for performing uplink transmission of the first service by the terminal device in the first time period.

In 140, the network device demodulates the first service according to the power information.

Optionally, in the embodiment of the present application, the terminal device may perform channel estimation to obtain actual power used for transmitting the second service, and may obtain the transmitting power actually used for the first service, based on the actual power used for transmitting the second service as well as the maximum power the terminal device can use.

In this solution, the terminal device can directly notify the network device of the transmitting power actually used for the first service.

At this time, the network device can demodulate the first service received in the first time period according to the transmitting power actually used for the first service.

Alternatively, the difference between the transmitting power actually used for the first service and the specific power is notified to the network device.

At this time, the network device can, based on a Demodulation Reference Signal (DMRS) calculated for the second service at a specific power and the difference, obtain a new DMRS, and demodulate the first service received in the first time period with the new DMRS.

Specifically, the terminal device may carry information related to f(P_e, P_1) in the transmission of the URLLC, wherein f is a function, and the value is as the above Manner 2 shows. After the network side detects the information, the network side knows information on the difference between P_e and P_1. Based on this information, the current eMBB transmission is demodulated based on this information.

Alternatively, the terminal device may determine whether the transmitting power actually used for the first service equals to the specific power, and notify the network device of the information whether they are the same or different.

At this time, if the transmitting power actually used for the first service equals to the specific power, the network device may use the demodulation reference signal DMRS calculated for the second service at a specific power to demodulate the first service received in the first time period.

Specifically, the terminal device may carry information related to f(P_e, P_1) in the transmission of the URLLC, wherein f is a function, and the value is as the above Manner 1 shows, that is, P_e and P_1 are the same or different.

For example, the range of the difference (P_e−P_1) is in a prescribed set. After receiving the URLLC transmission, the network side demodulates it to obtain the corresponding indication: if the power of the eMMB has not changed, the network side performs demodulation normally; and if the power of the eMMB has changed, the network determines which of the specified sets the difference (P_e−P_1) belongs to by a certain method, and then demodulates the current eMBB transmission based on the determining result.

If the transmitting power actually used for the first service is different from the specific power, the network device may utilize the demodulation reference signal DMRS calculated for the second service at a specific power, and the estimated difference between the actually used transmitting power and the specific power to obtain anew DMRS, and demodulates the first service received in the first time period with the new DMRS.

Optionally, according to the power for transmitting the second service by the terminal device to the network device in the first time period and a power difference set corresponding to the first service, power information for performing uplink transmission of the first service in the first time period is determined, wherein the power difference set includes an optional difference value between an actual power used by the terminal device for performing uplink transmission of the first service and the specific power.

Specifically, the terminal device may perform channel estimation to obtain actual power used for transmitting the second service, and may, according to the actual power used for transmitting the second service, the maximum transmitting power that the terminal device can use and an optional difference value in a difference set, obtain the transmitting power actually used for the first service.

Optionally, the specific power is a power used for performing transmission of the first service separately in a time period immediately before the first time period. For example, as shown in FIG. 2, the first time period may be t1, and the specific power may be the power used for performing transmission the first service in the t2 time period.

Optionally, the difference set is preset on the terminal device or configured by the network device to the terminal device.

Optionally, the difference information includes a quantized value or an identification of a range to which the difference belongs.

In an implementation, the difference information includes a quantized value; and the network device demodulates the first service according to the power information.

Specifically, the network device may utilize the demodulation reference signal DMRS calculated for the second service at a specific power, and the quantized difference value, to obtain a new DMRS, and demodulate the first service received in the first time period with the new DMRS.

In an implementation, the difference information includes an identification of a range to which the difference belongs; and the network device demodulates the first service with a difference included in the range.

Specifically, the range to which the difference belongs may include a plurality of differences, and the network device may use the plurality of differences to demodulate the first service received in the first time period in sequence, to directly demodulate the first service.

Therefore, in the embodiment of the present application, when the terminal device simultaneously performs uplink transmission of the first service and the at least one second service in the first time period, during transmission of the first service performed in the first time period, power information for performing the uplink transmission of the first service in the first time period is sent to the network device, so that the network device can accurately acquire the power information of the first service when the first service and the second service are simultaneously performed, and thus correctly demodulate the first service, which can improve communication performance.

Figure 4:
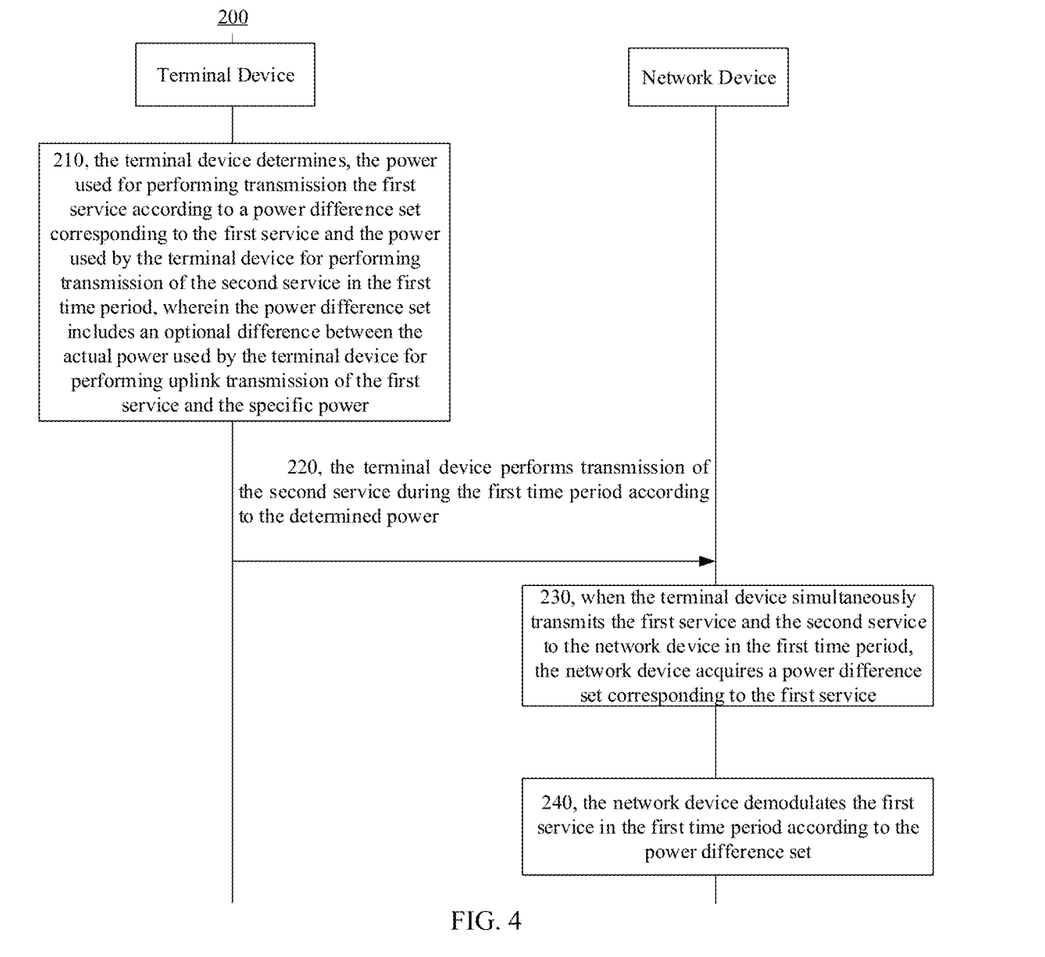
FIG. 4 is a schematic flowchart of a wireless communication method according to an embodiment of the present application.

FIG. 4 is a schematic flowchart of a wireless communication method 200 according to an embodiment of the present application. The method 200 includes at least some of the following.

In 210, the terminal device determines the power used for performing transmission the first service according to a power difference set corresponding to the first service and the power used by the terminal device for performing transmission of the second service in the first time period, wherein the power difference set includes an optional difference between the actual power used by the terminal device for performing uplink transmission of the first service and the specific power.

Optionally, the second service has a higher priority than that of the first service.

Optionally, the first service is an enhanced mobile broadband eMBB service; the second service is a low latency and high reliability scenario URLLC service.

Specifically, the terminal device may perform channel estimation to obtain actual power used for transmitting the second service, and based on the actual power used for transmitting the second service, as well as the maximum transmitting power the terminal device can and an optional difference in a difference set, may obtain the transmitting power actually used for the first service.

In 220, the terminal device performs transmission of the second service during the first time period according to the determined power.

In 230, when the terminal device simultaneously transmits the first service and the second service to the network device in the first time period, the network device acquires a power difference set corresponding to the first service.

In 240, the network device demodulates the first service in the first time period according to the power difference set, wherein the power difference set includes an optional difference between the actual power used by the terminal device for performing uplink transmission of the first service and the specific power.

Specifically, the terminal device may not carry the power information described in the above method 100 when the URLLC transmission and the eMMB are concurrently transmitted, and the network device may determine, according to the received signal, which of the specified sets the difference ($P\_e-P\_1$) belongs to, and then demodulates the current eMBB transmission based on the determining result. Alternatively, the network side uses the element in the specified set according to a certain method to perform demodulation attempt on the eMBB until the demodulation is successful (or the demodulation is partially successful), or the traversal is completed.

Specifically, the network device may demodulate the first service received in the first time period by using the optional difference value included in the difference set in sequence, and directly demodulate the first service.

Optionally, the difference set is preset on the terminal device or configured by the network device to the terminal device.

Optionally, the specific power is a power used for performing transmission of the first service separately in a time period immediately before the first time period.

Therefore, in the embodiment of the present application, the terminal device determines, according to the power difference set corresponding to the first service, the power used for performing the transmission of the first service, wherein the power difference set includes an optional difference between the actual power used by the terminal device for performing uplink transmission of the first service and the specific power, and the network device demodulates the first service in the first time period according to the power difference set, so that the network device can be correctly demodulate the first service, which can improve the communication performance.

It should be understood that the embodiments of the method 100 and the method 200 may be used in combination without contradiction.

Figure 5:
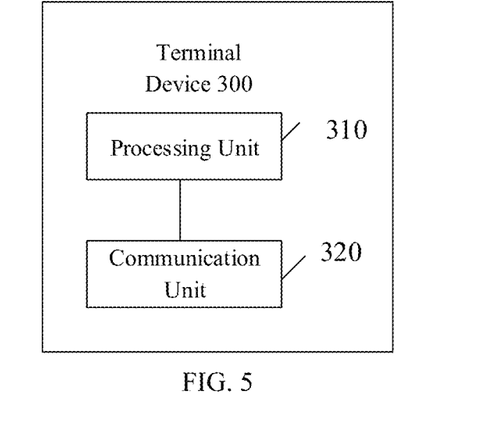
FIG. 5 is a schematic block diagram of a terminal device according to an embodiment of the present application.

FIG. 5 is a schematic block diagram of a terminal device 300 according to an embodiment of the present application. As shown in FIG. 5, the terminal device 300 includes a processing unit 310 and a communication unit 320.

Optionally, the processing unit 310 is configured to determine power information for performing uplink transmission of a first service in a first time period, wherein the terminal device simultaneously performs uplink transmission of the first service and at least one second service in the first time period. The communication unit 320 is configured to send the power information to the network device in the uplink transmission of the second service performed in the first time period.

It should be understood that the terminal device 300 may correspond to the terminal device in the above method 100, and the corresponding operations performed by the terminal device in the method 100 may be implemented. For brevity, details are not repeated herein.

Optionally, the processing unit 310 is configured to, according to a power difference set corresponding to the first service and the power for transmitting the second service by the terminal device in the first time period, determine power for performing uplink transmission of the first service in the first time period, wherein the power difference set includes an optional difference value between an actual power used by the terminal device for performing uplink transmission of the first service and the specific power. The communication unit 320 is configured to perform the transmission of the second service during the first time period: according to the power determined by the processing unit 310.

It should be understood that the terminal device 300 may correspond to the terminal device in the above method 200, and the corresponding operations performed by the terminal device in the method 200 may be implemented. For brevity, details are not repeated herein.

Figure 6:
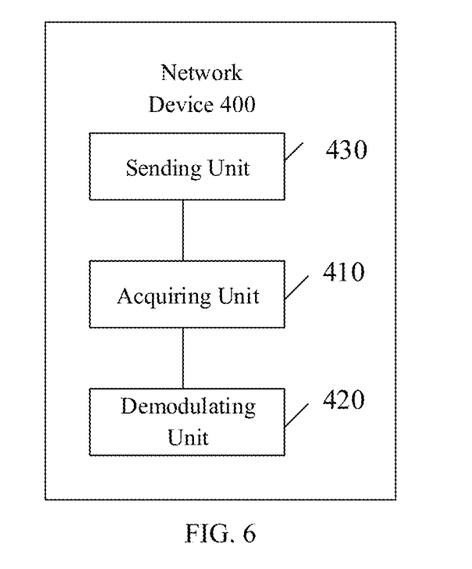
FIG. 6 is a schematic block diagram of a network device according to an embodiment of the present application.

FIG. 6 is a schematic block diagram of a network device 400 according to an embodiment of the present application. As shown in FIG. 6, the network device 400 may include an acquiring unit 410 and a demodulating unit 420.

Optionally, the acquiring unit 410 is configured to receive power information sent by the terminal device in an uplink transmission of the second service performed by the terminal device in the first time period, wherein the power information is power information for performing uplink transmission of the first service by the terminal device in the first time period. The demodulation unit 420 is configured to demodulate the first service according to the power information.

Optionally, as shown in FIG. 6, the network device 400 may further include a sending unit 430, configured to configure a power difference set in the method 100.

It should be understood that the network device 400 may correspond to the network device in the above method 100, and may perform corresponding operations performed by the network device in the method 100. For brevity, details are not repeated herein.

Optionally, the acquiring unit 410 is configured to, when the terminal device transmits the first service and the second service to the network device in the first time period, acquire the power difference set corresponding to the first service. The demodulation unit 420 is configured to demodulate the first service in the first time period according to the power difference set, wherein the power difference set includes optional difference values between an actual power used by the terminal device for performing uplink transmission of the first service and the specific power.

Optionally, as shown in FIG. 6, the network device 400 may further include a sending unit 430, configured to configure the power difference set in the method 200.

It should be understood that the network device 400 may correspond to the network device in the above method 200, and may perform corresponding operations performed by the network device in the method 200. For brevity, details are not repeated herein.

Figure 7:
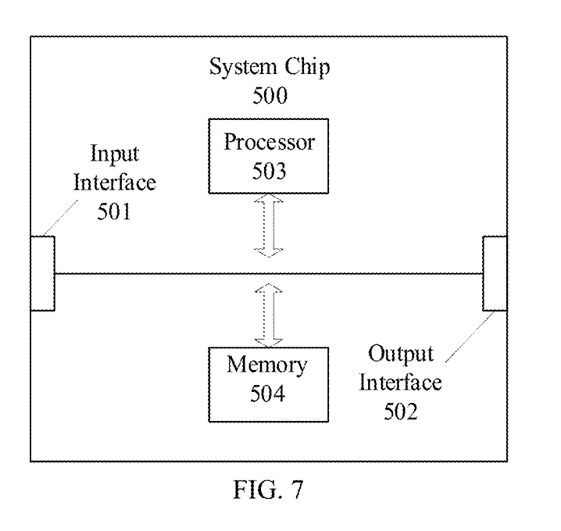
FIG. 7 is a schematic block diagram of a system chip according to an embodiment of the present application.

FIG. 7 is a schematic structural diagram of a system chip 500 according to an embodiment of the present application. The system chip 500 of FIG. 7 includes an input interface 501, an output interface 502, a processor 503, and a memory 504 that can be connected by an internal communication connection line. The processor 503 is configured to execute codes in the memory 504.

Optionally, when the codes are executed, the processor 503 implements the method performed by the network device or the terminal device in the method embodiment. For the sake of brevity, details are not repeated herein.

Figure 8:
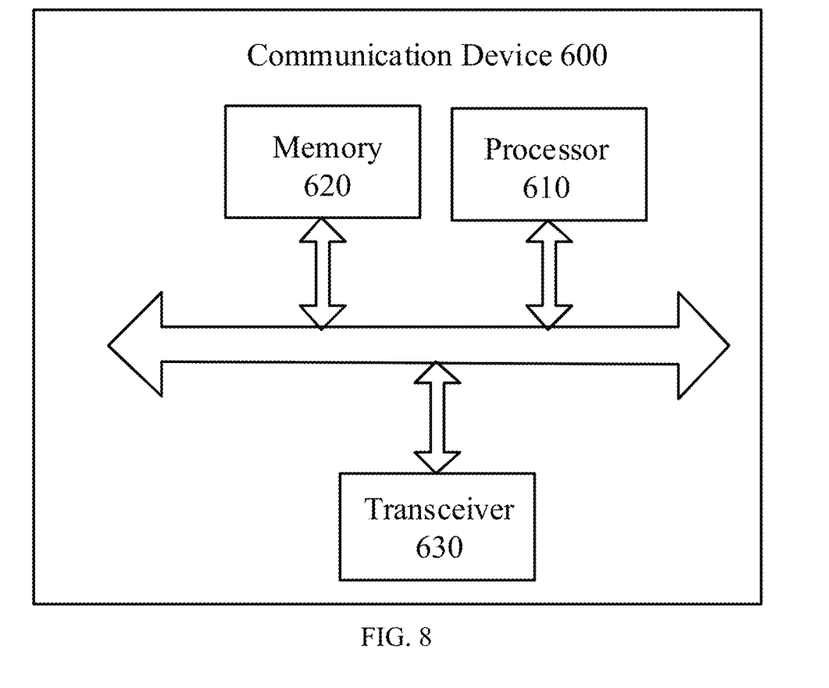
FIG. 8 is a schematic block diagram of a communication device according to an embodiment of the present application.

FIG. 8 is a schematic block diagram of a communication device 600 according to an embodiment of the present application. As shown in FIG. 8, the communication device 600 includes a processor 610 and a memory 620. The memory 620 can store program codes, and the processor 610 can execute the program codes stored in the memory 620.

Optionally, as shown in FIG. 8, the communication device 600 can include a transceiver 630, and the processor 610 can control the transceiver 630 to communicate externally.

Optionally, the processor 610 can call the program codes stored in the memory 620 to perform the corresponding operations of the network device or the terminal device in the method embodiment. For brevity, details are not repeated herein.

The method embodiments in the embodiments of the present application may be applied to a processor or implemented by a processor. The processor may be an integrated circuit chip with signal processing capabilities. In the implementation process, each step of the above method embodiment may be completed by an integrated logic circuit of hardware in a processor or instructions in a form of software. The above processor may be a general purpose processor, a digital signal processor (DSP), an application specific integrated circuit (ASIC), a field programmable gate array (FPGA) or programming logic devices, transistor logic devices, discrete hardware components and the like. The methods, steps, and logical block diagrams disclosed in the embodiments of the present application can be implemented or executed. The general purpose processor may be a microprocessor or the processor may be any conventional processor or the like. The steps of the method disclosed in the embodiment of the present application may be directly implemented as a hardware decoding processor, or may be performed by a combination of hardware and software modules in the decoding processor. The software modules can be located in a conventional storage medium such as a random access memory, a flash memory, a read only memory, a programmable read only memory or an electrically erasable programmable memory, a register, and the like. The storage medium is located in the memory, and the processor reads information in the memory and completes the steps of the above method with the hardware.

It can be understood that, in the embodiment of the present application, the memory may be a volatile memory or a non-volatile memory, or may include both volatile and non-volatile memory. The non-volatile memory may be a read-only memory (ROM), a programmable read only memory (PROM), an erasable programmable read only memory (erasable PROM, EPROM), or an electrical Erase programmable EPROM (EEPROM) or a flash memory. The volatile memory can be a random access memory (RAM) that functions as an external cache. By way of example and without limitation, many forms of RAM are available, such as a static random access memory (SRAM), a dynamic random access memory (DRAM), a synchronous dynamic random access memory (synchronous DRAM, SDRAM), double data rate synchronous DRAM (DDR SDRAM), an enhanced synchronous dynamic random access memory (ESDRAM), a synchronously connected dynamic random access memory (synch link DRAM, SLDRAM) and a direct memory bus random access memory (DR RAM). It should be noted that the memories of the systems and methods described herein are intended to include, but not limited to, these and any other suitable type of memory.

In the end, it is to be understood that the terms used in the embodiments of the present application and the appended claims are merely for the purpose of describing particular embodiments, and are not intended to limit the embodiments.

For example, the singular forms "a", "an" and "the" used in the embodiments of the present application and the appended claims also intended to include plurality forms, unless the context clearly indicates other meanings.

For another example, the terms first type cell group and second type cell group may be employed in the embodiments of the present application, but these types of cell groups should not be limited to these terms. These terms are only used to distinguish one type of cell groups from another.

Also for example, depending on the context, the words "upon" as used herein may be interpreted as "if" or "where" or "when" or "in response to determining" or "in response to detecting". Similarly, depending on the context, the phrase "if determining" or "if detecting (conditions or events stated)" may be interpreted as "when determining" or "in response to determining" or "when detecting (condition or event stated)" or "in response to detecting (condition or event stated)".

Those of ordinary skill in the art will appreciate that the elements and algorithm steps of the various examples described in connection with the embodiments disclosed herein can be implemented in electronic hardware or a combination of computer software and electronic hardware. Whether these functions are performed in hardware or software depends on the specific application and design constraints of the solution. A person skilled in the art can use different methods to implement the described functions for each particular application, but such implementation should not be considered to be beyond the scope of the embodiments of the present application.

A person skilled in the art can clearly understand that for the convenience and brevity of the description, the specific working process of the system, the device and the unit described above can refer to the corresponding process in the above method embodiments, and details are not repeated herein.

In the several embodiments provided in the present application, it should be understood that the disclosed systems, devices, and methods may be implemented in other ways. For example, the device embodiments described above are only illustrative. For example, the division of the unit is only a logical function division. In actual implementation, there may be another division manner, for example, a plurality of units or components may be combined or can be integrated into another system, or some features can be ignored or not executed. In addition, the mutual coupling or direct coupling or communication connection shown or discussed may be an indirect coupling or communication connection through some interfaces, devices or units, and may be in an electrical, mechanical or other form.

The units described as separate components may or may not be physically separated, and the components shown as units may or may not be physical units, that is, may be located in one place, or may be distributed to a plurality of network units. Some or all of the units may be selected according to actual needs to achieve the objectives of the embodiments of the present application.

In addition, each functional unit in the embodiment of the present application may be integrated into one processing unit, or each unit may exist physically separately, or two or more units may be integrated into one unit.

If implemented in the form of a software functional unit and sold or used as a standalone product, it can be stored in a computer readable storage medium. Based on such understanding, the technical solution of the embodiments of the present application in essential, or the part contributing to the prior art or the part of the technical solution, may be embodied in the form of a software product stored in a storage medium. The computer software product is stored in a storage medium and includes instructions for causing a computer device to perform all or part of the steps of the method described in the embodiments of the present application. The above storage medium includes: a U disk, a mobile hard disk, a read only memory, a random access memory, a magnetic disk, or an optical disk, and the like, which can store program codes.

The above is only a specific embodiment of the present application, but the scope of protection of the present application is not limited thereto, and changes or substitutions that could be easily contemplated by any person skilled in the art within the technical scope disclosed in the present application should be covered by the scope of protection of this application. Therefore, the protection scope of the present application should be subject to the protection scope of the claims.

What is claimed is:

1. A wireless communication method, comprising:
    determining, by a terminal device, power information for performing uplink transmission of a first service in a first time period, wherein the terminal device simultaneously performs uplink transmission of the first service and at least one second service in the first time period; and
    sending, by the terminal device, the power information to a network device in the uplink transmission of the second service performed in the first time period,
    wherein determining, by the terminal device, power information for performing uplink transmission of the first service in the first time period, comprises:
        determining power information for performing uplink transmission of the first service in the first time period according to the power for transmitting the second service by the terminal device to the network device in the first time period and/or a power difference set corresponding to the first service,
        wherein the power difference set comprises an optional difference value between an actual power used by the terminal device for performing uplink transmission of the first service and a specific power.

2. The method according to claim 1, wherein the second service has a higher priority than that of the first service.

3. The method according to claim 1, wherein the first service is an enhanced mobile broadband eMBB service; and the second service is a low latency high reliability scenario URLLC service.

4. The method according to claim 1, wherein sending, by the terminal device, the power information to the network device in the uplink transmission of the second service performed in the first time period comprises:
    carrying the power information in a first message sent by the terminal device to the network device, wherein the first message further carries data of the second service or other information.

5. The method according to claim 1, wherein the difference set is preset on the terminal device or configured by the network device to the terminal device.

6. The method according to claim 1, wherein the power information is used to indicate:
whether an actual power used by the terminal device for performing uplink transmission of the first service in the first time period equals to a specific power; and/or
information on a difference between the actual power used by the terminal device for performing uplink transmission of the first service in the first time period and the specific power.

7. The method according to claim 6, wherein the information on the difference comprises a quantized value or an identification of a range to which the difference belongs.

8. The method according to claim 1, wherein the specific power is a power used for performing transmission of the first service separately in a time period immediately before the first time period.

9. A wireless communication method, comprising:
determining, by a terminal device, a power used for performing transmission a first service according to a power difference set corresponding to the first service and a power used by the terminal device for performing transmission of a second service in a first time period, wherein the power difference set comprises an optional difference between an actual power used by the terminal device for performing uplink transmission of the first service and a specific power; and
performing, by the terminal device, transmission of the second service during the first time period according to the determined power.

10. A terminal device, comprising a processor, a memory, and a transceiver, the processor, the memory, and the transceiver communicate with one another through an internal connection path, to transmit control and/or data signals, such that the terminal device performs the method according to claim 9.

11. The terminal device according to claim 10, wherein the specific power is a power used for performing transmission of the first service separately in a time period immediately before the first time period.

12. The terminal device according to claim 10, wherein the second service has a higher priority than that of the first service.

13. The terminal device according to claim 10, wherein the first service is an enhanced mobile broadband eMBB service; and the second service is a low latency high reliability scenario URLLC service.

14. The terminal device according to claim 10, wherein the difference set is preset on the terminal device or configured by a network device to the terminal device.

15. A terminal device, comprising: a processor, a memory, and a transceiver, the processor, the memory, and the transceiver communicate with one another through an internal connection path, to transmit control and/or data signals, to cause the terminal device to:
determine, by the processor, power information for performing uplink transmission of a first service in a first time period, the terminal device simultaneously performs uplink transmission of the first service and at least one second service in the first time period; and
send, by the transceiver, the power information to a network device in the uplink transmission of the second service performed in the first time period,
wherein the processor is further configured to:
determine power information for performing uplink transmission of the first service in the first time period according to the power for transmitting the second service by the terminal device to the network device in the first time period and/or a power difference set corresponding to the first service; and
the power difference set comprises an optional difference value between an actual power used by the terminal device for performing uplink transmission of the first service and a specific power.

16. The terminal device according to claim 15, wherein the second service has a higher priority than that of the first service.

17. The terminal device according to claim 15, wherein the first service is an enhanced mobile broadband eMBB service; and the second service is a low latency high reliability scenario URLLC service.

18. The terminal device according to claim 15, wherein the transceiver is further configured to:
carry the power information in a first message sent by the terminal device to the network device, and the first message further carries data of the second service or other information.

19. The terminal device according to claim 15, wherein the difference set is preset on the terminal device or configured by the network device to the terminal device.

20. The terminal device according to claim 15, wherein the power information is used to indicate one of the following:
whether an actual power used by the terminal device for performing uplink transmission of the first service in the first time period equals to a specific power; and
information on a difference between the actual power used by the terminal device for performing uplink transmission of the first service in the first time period and the specific power.

21. The terminal device according to claim 20, wherein the information on the difference comprises a quantized value or an identification of a range to which the difference belongs.

22. The terminal device according to claim 15, wherein the specific power is a power used for performing transmission of the first service separately in a time period immediately before the first time period.

\* \* \* \* \*